Patented Oct. 16, 1923.

1,470,772

UNITED STATES PATENT OFFICE.

LEO SIMON, OF NEW YORK, N. Y., ASSIGNOR TO HENRY L. GREENBAUM, OF NEW YORK, N. Y.

PASTE FOR ETCHING GLASS.

No Drawing.　　Application filed August 21, 1922.　Serial No. 583,371.

*To all whom it may concern:*

Be it known that I, LEO SIMON, a citizen of Germany, residing in the city of New York, in the county of Bronx and State of New York, have invented certain new and useful Improvements in Pastes for Etching Glass, of which the following is a full, clear, and concise description.

My invention relates to materials for etching glass, for the purpose of conferring upon the same a frosty appearance.

More particularly stated, I seek to make an etching material in the form of a paste, which may be rendered thick or thin, strong or weak, as desired, and possessing a number of advantages, among which are the following:

I. The parts may be safely handled, without danger of injury to the skin or nails of the operator.

II. It may be shipped long distances and kept in ordinary standard receptacles without the formation of dangerous or disagreeable fumes, and without injury to the container.

III. It is well adapted for use in frosting incandescent bulbs, in lettering bottles, in the preparation of glass signs, and in practically any relation in which an etching material is ordinarily used.

IV. It retains its consistency except where it is diluted or otherwise treated for the purpose of rendering its consistency different.

V. It can be made cheaply and in any desired quantity, without the necessity for special skill in chemistry.

VI. It acts uniformly when the conditions are uniform, and the etching effect can be varied within wide limits by controlling the period of time during which the paste acts upon the glass surface.

VII. It is especially adapted for enabling incandescent lamp bulb to be etched quickly and thoroughly by dipping them bodily into the paste.

VIII. It is a great time saver, especially when used for frosting bulbs and the like by dipping, in that it enables the operator to reduce to a minimum the time during which the container is occupied by the bulbs.

IX. It may be applied by means of a brush to the surface to be etched or otherwise treated.

In making my paste I proceed as follows:

I take mucilage in variable quantity, say for instance two pounds, and to it I add a half a pound of sulphuric acid ($H_2SO_4$), of a density of 66 Baumé. The resulting mass thereupon becomes heated, and I allow it to cool. I then add ammonium fluoride in the form of granules or crystals, the quantity being properly proportioned to develop hydrofluoric acid and thus being somewhat less than half a pound. To be exact, I use seventy-four parts of aluminum fluoride to each ninety-six parts of sulphuric acid. The following reaction takes place $H_2SO_4 + 2NH_4F = (NH_4)_2SO_4 + 2HF$.

The action of the mucilage is purely physical. The mucilage is simply a diluent, and is used to confer upon the paste any desired consistency. The paste is preferably given a consistency about like that of molasses.

Expressing the proportions by percentage I employ, by weight, approximately 57% of sulphuric acid to 43% of ammonium fluoride. Since the mucilage is merely a diluent and its proportion may be varied, as above stated, I make no effort to define its percentage in the finished paste.

As a mucilage I may use gum arabic dissolved in warm water, and brought to proper consistency, depending to some extent upon the judgment of the operator. Sometimes I use Iceland moss, cooked in water and pressed out like gelatine. In other instances I employ agar agar. To do this I dissolve it in boiling water and allow it to cool, the amount of water determining the consistency of the mucilage.

For some purposes I substitute acetic acid for the sulphuric acid, the proportion of acetic acid used being determined by the chemical equivalence of the acetic acid for the purpose of producing hydrofluoric acid. Thus I can use any acid which, by its reaction upon ammonium fluoride, will develop hydrofluoric acid.

The paste thus made admits of a large number of important and practical uses. It may be applied to a glass surface by means of a brush, or by pouring, or by dipping. It also can be applied, if desired, by dropping; this is, by letting it fall upon the surface, one drop at a time.

When applied with a brush, it can be used after the manner of a paint or varnish.

For frosting incandescent lamp bulbs, I simply dip them into the mass of the paste, and then quickly remove them. The paste adheres to them until removed, and it is removed by simply rinsing it off in clear water. By thus using the paste, the unused portion thereof is kept in good condition for future service. Heretofore it has been customary to place the incandescent lamp bulbs in an etching fluid, leaving them there until the glass was sufficiently etched to give it the desired frosty appearance. This method, however, has a very serious disadvantage, in that the glass, being dissolved in the etching fluid, weakens the etching strength of the latter. By dripping the bulb into the paste and quickly removing the bulb, I prevent the unused portion of the paste from becoming weakened, contaminated, or otherwise damaged. The net result is that there is a great saving in the ultimate cost of the chemicals employed in making the paste, other factors remaining unchanged.

In this connection it may be noted that when an article to be etched is dipped into a volume of the paste and quickly removed, as above described, this does not mean that the exposure of the surface to be etched is lessened to any extent. The bulb or bottle to be etched, after being dipped and removed, can remain exposed to the action of the small quantity of paste it carries, for any period of time desired by the operator. This period may readily be from one to five minutes, or even longer. The operator, while waiting for the paste to act, can go ahead dipping other bulbs or bottles. There is thus a saving of the operator's time as well as the saving above referred to, in avoiding waste of the material.

In my improved paste, as in many other etching materials, the etching is done by hydrofluoric acid. However, in my paste the acid is used much more conveniently, efficiently and economically.

I find that the paste prepared as above described may be kept for long periods of time in ordinary containers of standard manufacture, and that it may be shipped over any desired distances without impairing its quality or condition. In my improved paste the contained hydrofluoric acid is prevented from volatilizing and thus making its escape. Because of this fact, the paste does not give off in appreciable quantities the poisonous and irritating fumes which characterize most of the etching liquids and preparations heretofore used.

I do not limit myself to the precise materials employed, as variations may be made therein without departing from my invention, the scope of which is commensurate with my claims.

I claim—

1. A paste for etching glass, containing ammonium sulphate, hydrofluoric acid and a liquid mucilage.

2. A paste for etching glass, containing an ammonium salt, hydrofluoric acid and a mucilage.

3. A paste for etching glass, containing an ammonium salt, hydrofluoric acid and a mucilage, the proportion of mucilage being large as compared with the total quantity of the paste.

4. A paste for etching glass, containing a liquid mucilage and hydrofluoric acid.

5. A paste for etching glass, containing mucilage as a diluent, and a small proportion of hydrofluoric acid.

LEO SIMON.